(12) United States Patent
Asadi

(10) Patent No.: US 7,047,007 B1
(45) Date of Patent: May 16, 2006

(54) AUTOMATIC GPRS RE-ATTACH AFTER CELL RESELECTION

(75) Inventor: Mehrzad Asadi, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 148 days.

(21) Appl. No.: 10/709,857

(22) Filed: Jun. 2, 2004

(51) Int. Cl.
*H04Q 7/20* (2006.01)

(52) U.S. Cl. .............................. 455/435.1; 455/426.1; 455/437; 455/454; 455/525; 370/338; 370/349

(58) Field of Classification Search .. 455/435.1–435.2, 455/436–439, 445, 452.2, 453, 426.1, 454, 455/525, 524, 414.1; 370/338, 349, 352–356
See application file for complete search history.

(56) References Cited

U.S. PATENT DOCUMENTS 5,862,482 A    1/1999   Beesley
6,463,055 B1 * 10/2002  Lupien et al. .............. 370/353

OTHER PUBLICATIONS

Digital Cellular Telecommunications System (Phase 2+): Universal Mobile Radio Interface Layer 3 specification; Core network Protocols; Stage 3 (3GPP TS 24.008 version 5.10.0 Release 5); ETSI TS 124 008:, ETSI Standards, European Telecommunications Standards Institute, Sophia-Antipo.

Sony Ericsson Mobile Communications AB, *International Application Ser. No. PCT/US2006/011356*, "International Search Report", Jul. 22, 2005.
Sony Ericsson Mobile Communications AB, *International Application Ser. No. PCT/US2006/011356*,"Written Opinion", Jul. 22, 2005.

\* cited by examiner

*Primary Examiner*—Sonny Trinh
*Assistant Examiner*—Marcos L. Torres
(74) *Attorney, Agent, or Firm*—Moore & Van Allen, PLLC; Gregory A. Stephens

(57) ABSTRACT

The present invention describes a method of automatically re-establishing a GPRS connection between a mobile station and a network in which the network service provider for the mobile station has changed following a network cell reselection procedure. The mobile station receives a detach_request from a first network to terminate a current GPRS connection between the mobile station and the first network. The mobile station then terminates the GPRS connection with the first network pursuant to the received detach request. The mobile station then determines if the detach_type parameter associated with the detach_request is set to re-attach_not_required. If this is true, then the mobile station determines if the detach_cause parameter associated with the detach request contains a null value. If this is also true, then the mobile station determines whether either the MCC or MNC of the new network cell is different from the previous network cell and whether the new network cell supports GPRS. If both these conditions are met, then the mobile station automatically initiates a GPRS attachment with the new network cell.

3 Claims, 2 Drawing Sheets

AUTOMATIC GPRS RE-ATTACH AFTER CELL RESELECTION

BACKGROUND OF INVENTION

Mobile station (MS) or mobile phone users increasingly rely on their mobile phones for their communication and organizational needs. Many of today's mobile phones are equipped to allow access to a wide variety of data services including e-mail and the Internet. The most prevalent cellular telephony standard is the Global System for Mobile Communications (GSM). Within the GSM standard, there are provisions for a variety of evolving data standards. One of the more popular data standards is the General Packet Radio Service (GPRS) standard. GPRS is popular because of its relatively high bandwidth characteristics that allow mobile phone users to send and receive data at generally satisfactory rates.

The GSM specification includes the GPRS sub-specification that governs the procedures for attaching and detaching a mobile station (MS) with a cellular network. Within the GSM/GPRS specification, however, there are scant provisions for automatic GPRS reattachment of a mobile station to the network following a network cell reselection procedure. Cell reselection can occur, for instance, when a mobile station is roaming from one service provider's area to another service provider's area.

What is needed is a procedure that seamlessly allows the mobile phone to re-attach to GPRS service after cell reselection provided the new cell supports GPRS.

SUMMARY OF INVENTION

The present invention describes a method of automatically re-establishing a GPRS connection between a mobile station and a network in which the network service provider for the mobile station has changed following a network cell reselection procedure. The mobile station receives a detach_request from a first network to terminate a current GPRS connection between the mobile station and the first network. The mobile station then terminates the GPRS connection with the first network pursuant to the received detach request. The mobile station then determines if the detach_type parameter associated with the detach_request is set to re-attach_not_required. If this is true, then the mobile station determines if the detach_cause parameter associated with the detach request contains a null value. If this is also true, then the mobile station determines whether either the MCC or MNC of the new network cell is different from the previous network cell and whether the new network cell supports GPRS. If both these conditions are met, then the mobile station automatically initiates a GPRS attachment with the new network cell.

The method may also be implemented by software as a computer program product or as a system within the mobile phone.

DETAILED DESCRIPTION

Figure 1:
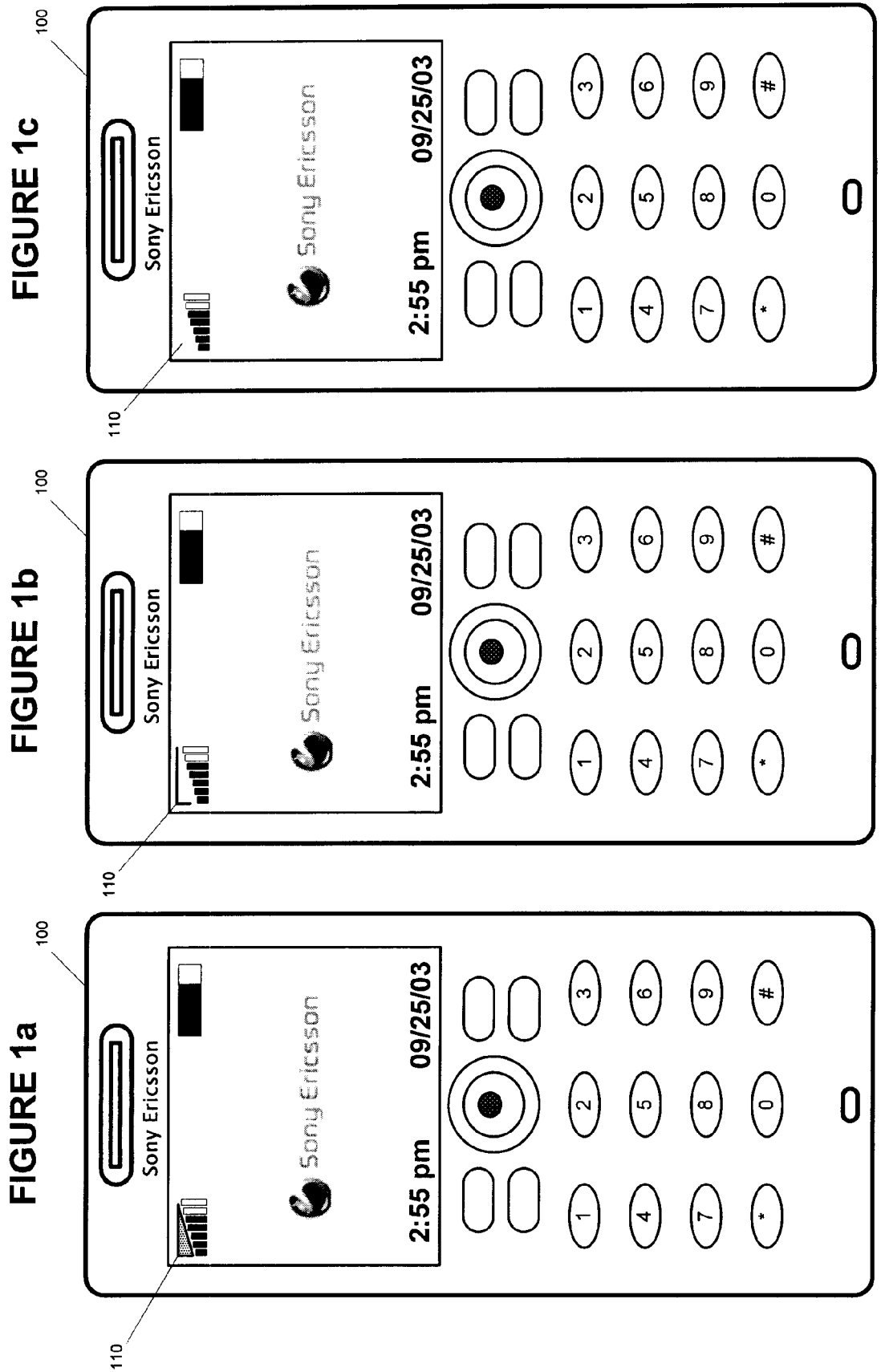
FIGS. 1a–1c illustrate a typical mobile phone highlighting the GPRS signal indicator.

FIGS. 1a–1c illustrate a typical mobile phone 100. Mobile phone 100 is shown having a display along with a keypad for entering data into the mobile phone. The display in this instance reserves the upper left corner 110 to illustrate signal strength to the user. The series of bars represent the signal strength for voice services. This informs the user whether or not there is sufficient signal strength between the mobile station and the network for a voice call to be connected. The space above the series of bars is reserved for an icon that represents a data signal connection status.

In FIG. 1a, the data signal connection icon is illustrated as a shaded triangle. For purposes of the present invention, this indicates that the mobile station currently has a GPRS connection with the network. In FIG. 1b, the data signal connection icon is illustrated as an unshaded outline. This indicates that the mobile station currently does not have a GPRS connection with the network but that one is available if the user manually initiates a connection. In FIG. 1c, the data signal connection icon is completely blank. This indicates that the mobile station currently does not have a GPRS connection with the network and that one is unavailable at this time.

Figure 2:
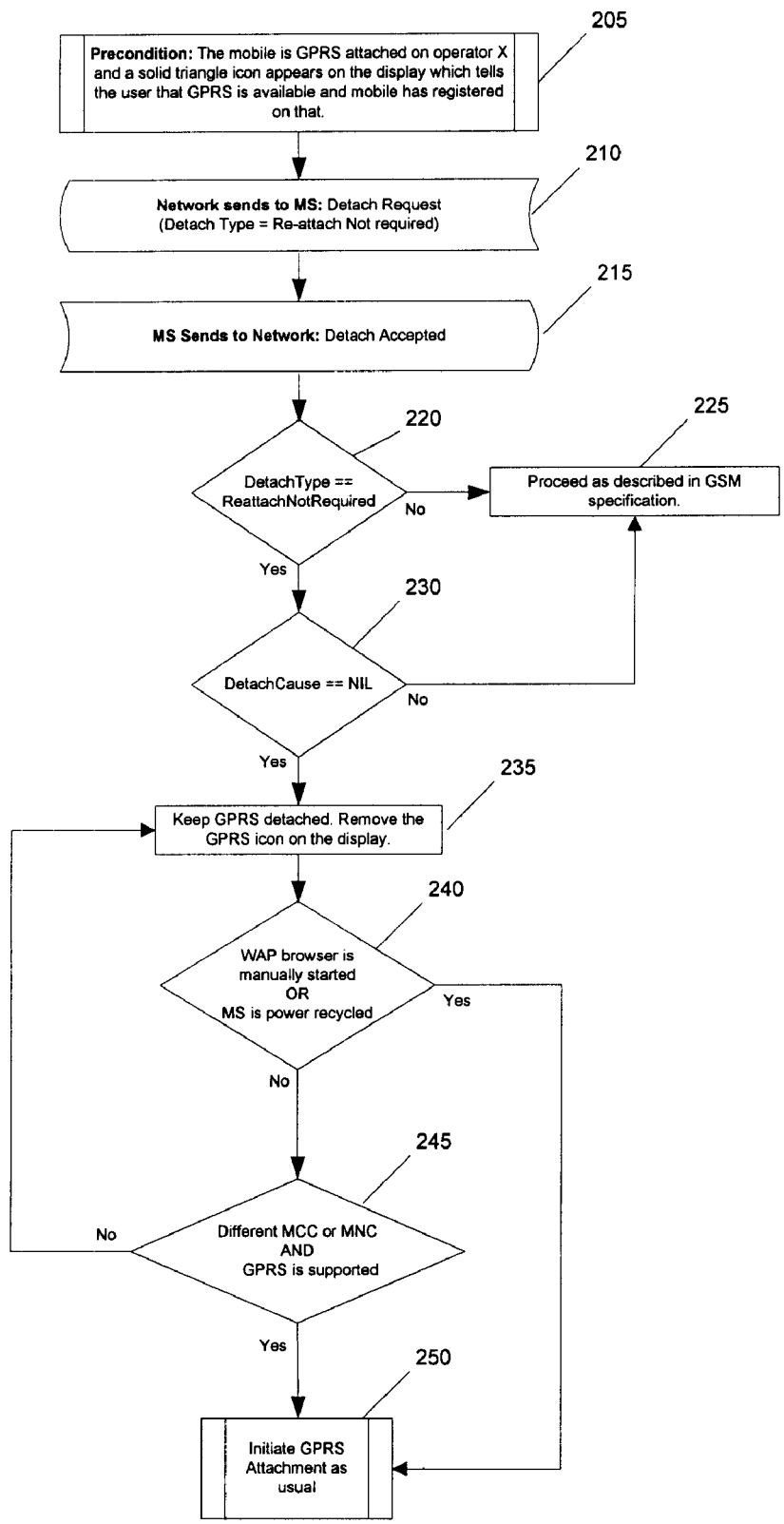
FIG. 2 illustrates a flowchart describing the present invention.

FIG. 2 is a flowchart illustrating the present invention. The present invention operates within the GSM/GPRS standards. As such, there is a pre-condition 205 that triggers the procedures of the present invention. The present invention operates when the mobile station is initially GPRS attached and registered with a network of a first service provider. Cell reselection from one service provider to another is a common occurrence when a mobile station is roaming. Often the service providers will have reciprocal agreements to handle the voice and data requests of mobile stations that are subscribed to the other service provider. Within the GSM specification, there are provisions for automatically maintaining a network connection during a cell reselection procedure for voice purposes. This is termed a "handoff" when the mobile switches from one cell to another cell. Cell reselection is quite common even when not roaming because a cell has a limited geographical coverage area. When relocating to a new cell operated by the same service provider, GPRS attachments are generally unaffected because the service provider's PLMN information remains unchanged. When relocating to a new cell operated by a different service provider, however, GPRS attachment is typically terminated because the PLMN information of the new service provider is different from that of the previous service provider. This is true even if the new service provider has a reciprocal agreement with the mobile station's home service provider. To re-attach to a GPRS connection, the mobile station is dependent on the user to either manually initiate a GPRS connection by accessing the mobile station's WAP browser, or power recycle the mobile station.

Referring again to FIG. 2, the mobile station receives a detach request from the network 210 presumably due to a cell reselection process in which the network service provider has changed. The mobile station carries out the network instruction and proceeds to detach the GPRS service from the network. The mobile station then sends a detach_accepted message to the network 215. The mobile station parses the detach_request instruction to determine whether reattachment is required 220 and the reason for detachment 230. If the detach_type is not set such that reattachment is not required, then the mobile phone proceeds as described by the GSM/GPRS specification 225. If the detach_type is set such that reattachment is not required, however, then the mobile phone examines the detach_cause parameter 230. If the detach_cause parameter is set to one of the enumerated values in the GSM/GPRS specification then the mobile phone again proceeds as described by the GSM/GPRS specification 225. In the alternative, the detach_cause parameter contains a null or NIL value. In this event, the mobile station will keep GPRS detached and remove the GPRS icon from the display 235. The mobile station then determines if the wireless application protocol (WAP) browser has been manually initiated or if the mobile station has been power recycled 240.

If either of these events have occurred, the mobile station will attempt to initiate a GPRS connection 250 as per the GSM/GPRS specification. Heretofore, if neither of these events occur, the data signal connection icon is completely blank as illustrated in FIG. 1c indicating that the mobile station currently does not have a GPRS connection with the network and that one is unavailable at this time.

The mobile station likely received the original detach_request for an unknown reason that has not been specifically enumerated in the GSM/GPRS specification. The previous cell was controlled by Service Provider X. The new cell is controlled by Service Provider Y. Service providers are identified pursuant to the GSM standard by a public land mobile network (PLMN) identifier that is comprised of a mobile country code (MCC) and mobile network code (MNC) parameter pairing. Each service provider has a unique PLMN.

Up to this point, the mobile station has merely been following the procedures set out by the GSM/GPRS specification. The present invention has added procedures to address the situation when the WAP browser has not been initiated or the mobile station has not been power recycled. In this event, the mobile station examines the PLMN identifier of the new service provider 245. First, the mobile station determines if either the MCC or MNC is different than the previous cell. Second, the mobile station determines if GPRS is available by listening for the SI13/PSI13 (Packet System Information 13) signal in the new cell. If there is a different MCC or MNC and GPRS is available, then a GPRS attachment request is automatically initiated 250 by the mobile station to the new cell's service provider. Otherwise, if the MCC and MNC are not different than the previous cell or GPRS is not supported by the new cell, then the mobile station will keep GPRS detached and remove the GPRS icon from the display 235.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A method of automatically re-establishing a GPRS connection between a mobile station and a network in which the network for the mobile station has changed from a first network to a second network following a cell reselection procedure, the method comprising: in the mobile station: receiving a detach request from a first network to terminate a current GPRS connection between the mobile station and the first network; terminating the GPRS connection between the mobile station and the first network pursuant to the received detach request; determining if the detach type parameter associated with the detach request is set to re-attach not required; determining if the detach cause parameter associated with the detach request contains a null value, when the detach type parameter associated with the detach request is set to re-attach not required; determining if either the MCC or MNC of the second network is different from the first network and whether the second network supports GPRS in the present cell, when the detach cause parameter associated with the detach request does contain a null value; and automatically initiating a GPRS attachment with the second network in the present cell, when either the MCC or MNC of the second network is different from the first network and the second network supports GPRS in the present cell.

2. A computer program product resident within a mobile station for automatically re-establishing a GPRS connection between a mobile station and a network in which the network for the mobile station has changed from a first network to a second network following a cell reselection procedure, the computer program product comprising: computer program code for receiving a detach request from a first network to terminate a current GPRS connection between the mobile station and the first network; computer program code for terminating the GPRS connection between the mobile station and the first network pursuant to the received detach request; computer program code for determining if the detach type parameter associated with the detach request is set to re-attach not required; determining if the detach cause parameter associated with the detach request contains a null value, when the detach type parameter associated with the detach request is set to re-attach not required; determining if either the MCC or MNC of the second network is different from the first network and whether the second network supports GPRS in the present cell, when the detach cause parameter associated with the detach request does contain a null value; and automatically initiating a GPRS attachment with the second network in the present cell, when either the MCC or MNC of the second network is different from the first network and the second network supports GPRS in the present cell.

3. A system for automatically re-establishing a GPRS connection between a mobile station and a network in which the network for the mobile station has changed from a first network to a second network following a cell reselection procedure, the system comprising: in the mobile station: receiving a detach request from a first network to terminate a current GPRS connection between the mobile station and the first network; terminating the GPRS connection between the mobile station and the first network pursuant to the received detach request; determining if the detach type parameter associated with the detach request is set to re-attach not required; determining if the detach cause parameter associated with the detach request contains a null value, when the detach type parameter associated with the detach request is set to re-attach not required; determining if either the MCC or MNC of the second network is different from the first network and whether the second network supports GPRS in the present cell, when the detach cause parameter associated with the detach request does contain a null value; and automatically initiating a GPRS attachment with the second network in the present cell, when either the MCC or MNC of the second network is different from the first network and the second network supports GPRS in the present cell.

* * * * *